United States Patent [19]

Brown

[11] Patent Number: 4,697,881

[45] Date of Patent: Oct. 6, 1987

[54] ANTI-GLARE FILTER

[75] Inventor: John W. Brown, New Hope, Pa.

[73] Assignee: Qantix Corporation, Flemington, N.J.

[21] Appl. No.: 726,115

[22] Filed: Apr. 23, 1985

[51] Int. Cl.⁴ .............................................. G02B 27/00
[52] U.S. Cl. .............................. 350/276 R; 350/339 F
[58] Field of Search ........ 350/339 F, 345, 276 R–283, 350/452, 167, 276 SL

[56] References Cited

U.S. PATENT DOCUMENTS

| | | |
|---|---|---|
| 1,060,787 | 5/1913 | Peterson . |
| 1,688,557 | 10/1928 | Ryan . |
| 2,075,065 | 3/1937 | Ish-Shabm et al. . |
| 2,388,203 | 10/1945 | Zindel, Jr. et al. . |
| 2,728,013 | 12/1955 | Tourshou et al. . |
| 2,740,954 | 4/1956 | Kleefield . |
| 2,875,543 | 3/1959 | Sylvester et al. . |
| 2,887,566 | 5/1959 | Marks . |
| 2,909,770 | 10/1959 | Pugsley . |
| 2,976,759 | 3/1961 | Blever ............................. 350/276 R |
| 3,258,590 | 6/1966 | Goodbar ..................... 350/276 R X |
| 3,377,479 | 4/1968 | Schreiber . |
| 3,708,622 | 1/1973 | Brown, Jr. et al. ...... 350/276 SL X |
| 3,718,078 | 2/1973 | Plummer . |
| 3,972,593 | 4/1976 | Appledorn et al. . |
| 4,082,433 | 4/1978 | Appledorn et al. . |
| 4,165,920 | 8/1979 | Brown ............................ 350/276 R |
| 4,473,277 | 9/1984 | Brown ........................ 350/276 R X |
| 4,548,472 | 10/1985 | Negishi ............................ 350/276 R |

FOREIGN PATENT DOCUMENTS 1226574  3/1971  United Kingdom .

Primary Examiner—L. T. Hix
Assistant Examiner—Brian W. Brown
Attorney, Agent, or Firm—Lerner, David, Littenberg, Krumholz & Mentlik

[57] ABSTRACT

A filter for reducing the glare of a viewing screen caused by ambient light is comprised of a substantially transparent sheet of material having first and second faces. The first face is substantially planar while the second face has a plurality of V-shaped grooves, each groove being formed by two walls. The geometry of the V-shaped grooves is such that ambient light enters the filter and becomes trapped therein due to internal reflection.

15 Claims, 3 Drawing Figures

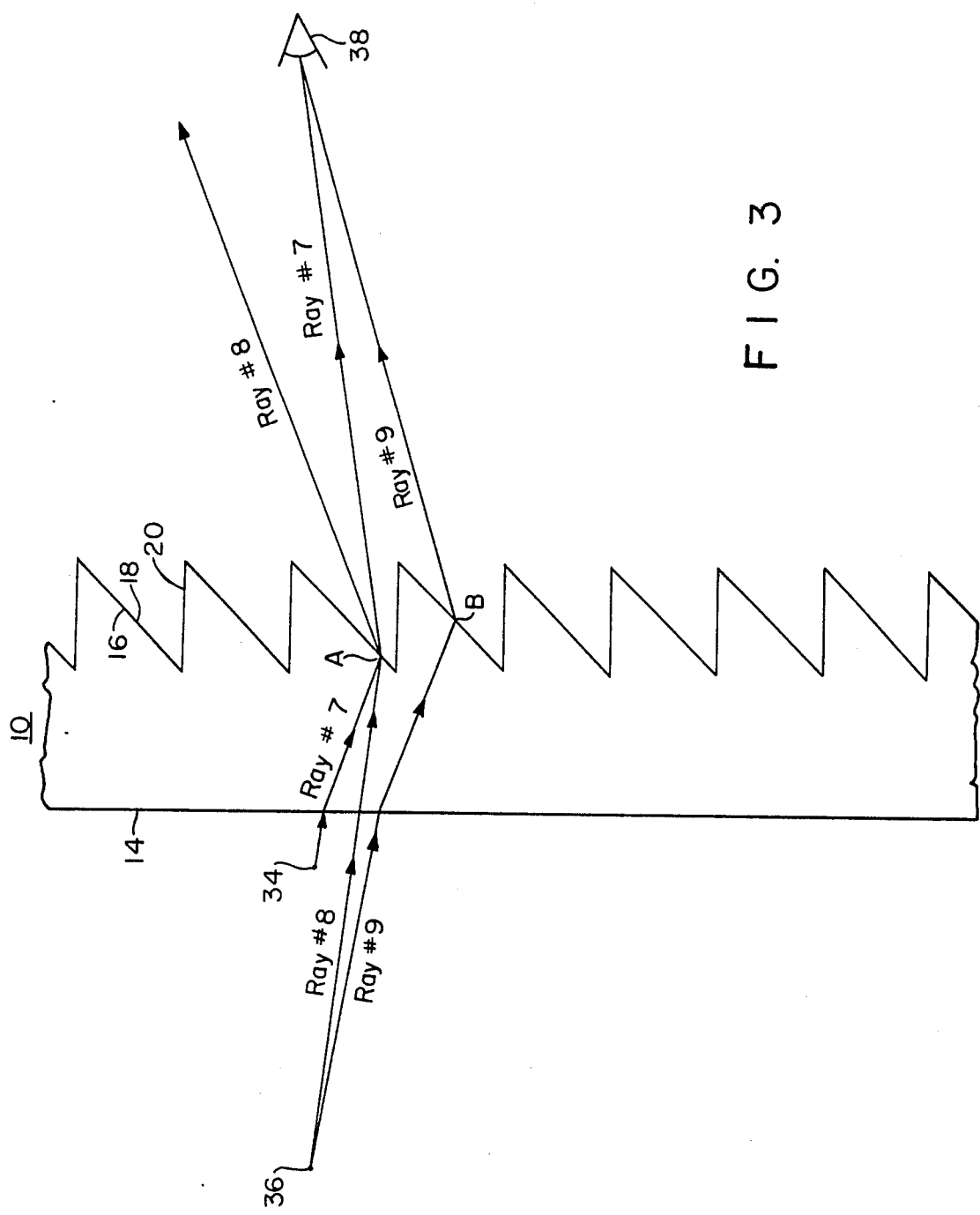

ANTI-GLARE FILTER

BACKGROUND OF THE INVENTION

The present invention is directed generally to anti-glare devices and more particularly to a filter for a transmission screen or liquid crystal display (LCD) for eliminating glare caused by ambient light.

It has long been recognized that the front face of a transmission screen such as the cathode ray tube (CRT) of an ordinary television screen or the CRT of a computer terminal produces glare caused by ambient light. As a result of this phenomena, a substantial amount of glare is encountered when viewing, for example, a CRT in a brightly lit room. The glare problem can be reduced by increasing the intensity of the radiation from the CRT. However, manufacturing CRT's capable of producing the intensity necessary to overcome glare encountered in a brightly lit room greatly increases the cost of the CRT. It is therefore desirable to produce a filter or overlay which will reduce the glare produced by ambient light.

My U.S. patent application Ser. No. 716,237, filed Aug. 20, 1976, now abandoned, was directed to an overlay or filter for the viewing surface of a television screen to reduce front face glare. The overlay is comprised of a sheet of transparent material having a planar back face and a front face having a plurality of V-shaped grooves therein such that the overlay, when viewed from the side, has a sawtooth profile. The overlay is flexible such that a film of oil is applied to the back surface of the overlay and, by pressing the overlay against the viewing surface of the television screen, the overlay adheres thereto. The adherence of the overlay to the television screen together with the film of oil therebetween minimizes the optical interference between the overlay and the television screen. Unfortunately, this overlay did not produce satisfactory results. The overlay produced images, known as echo images, which interfered with the intelligence displayed on the television screen.

In my U.S. Pat. No. 4,165,920, a front face glare reduction overlay including an echo reduction improvement is disclosed. The U.S. Pat. No. 4,165,920, which was filed during the pendency of my abandoned U.S. patent application Ser. No. 716,237, is directed to an improvement in the overlay disclosed in such abandoned application. The improvement involves applying a coating of opaque material to the peaks of the sawtooth forming the front surface of the overlay. It is also disclosed in the U.S. Pat. No. 4,165,920 that the horizontal portion of the sawtooth should be inclined approximately six degrees from the horizontal and the vertical portion of the sawtooth should be inclined approximately thirty degrees from the vertical. Using these angles in conjunction with the opaque material provides a front face glare reduction overlay which produces satisfactory results. However, despite the satisfactory results, it proved difficult to manufacture the peaks of the sawtooth with a sharp point. Because the peaks tended to have a round or lenticular shape, they were difficult to coat with the opaque material. Light from the transmission screen was refracted by the uncoated or partially coated peaks in a number of different vertical directions, thereby creating a further problem with echo images.

In an effort to provide an overlay or filter for the viewing surface of a transmission screen to reduce front face glare which is both inexpensive and easy to manufacture, I developed an anti-glare device which is described and illustrated in U.S Pat. No. 4,473,277. The anti-glare device of the U.S. Pat. No. 4,473,277 need not be applied directly to the surface of the CRT but can, in fact, be positioned a discrete distance therefrom. With the back surface thus free of the requirement of being tightly fitted to the transmission screen, it was discovered that the opaque material applied to the peaks of the sawtooth could be eliminated if a circular polarizer or some similar filter means was mounted to the back surface of the anti-glare device. The anti-glare device disclosed in the U.S. Pat. No. 4,473,277 proved to be easy to manufacture and free of echo image problems. However, the cost of the circular polarizer together with the time and expense required by the bonding step which bonded the circular polarizer to the anti-glare device increased the cost of the device.

SUMMARY OF THE PRESENT INVENTION

The shortcomings of the prior art discussed above are overcome by the present invention wherein, according to one embodiment of the present invention, an anti-glare filter for reducing the glare of a viewing screen caused by ambient light is comprised of a substantially transparent sheet of material having first and second faces. The first face is substantially planar and the second face has a plurality of V-shaped grooves, each groove being formed by two walls. A first wall of the V-shaped groove is inclined at an angle of at least the critical angle for the material with respect to the first face whereby ambient light entering the second face and reflecting off the first face is internally reflected.

According to another aspect of the present invention, the first wall is inclined at an angle above the critical angle with respect to the first face whereby ambient light entering the second face, passing through the first face, reflecting off the viewing screen, and passing back through the first face is internally reflected.

When the present invention is used in conjunction with a transmission screen, the anti-glare filter may be curved to follow the contours of the transmission screen.

According to another aspect of the present invention, the second wall of the V-shaped groove is inclined at an angle of between plus or minus 10 degrees with respect to a plane perpendicular to the first face. This second wall may be coated with an opaque material or may have a roughened surface to further improve the optical qualities of the anti-glare filter.

When the anti-glare filter of the present invention is used in conjunction with a liquid crystal display, a portion of the first wall is covered with an opaque material. That portion of the wall covered with the opaque material includes that portion of the wall which is furthest from the first face.

The present invention, by relying on its unique geometry, provides an anti-glare filter which is both easy and inexpensive to manufacture. These and other advantages and benefits of the present invention will become apparent from the description of a preferred embodiment hereinbelow.

BRIEF DESCRIPTION OF THE DRAWINGS

For a more complete understanding of the present invention, reference may be had to the following description of an exemplary embodiment considered in conjunction with the accompanying drawing, in which:

FIG. 3 is a side view of a portion of an anti-glare filter together with illustrative light rays emanating from two light sources.

DESCRIPTION OF A PREFERRED EMBODIMENT

Figure 1:
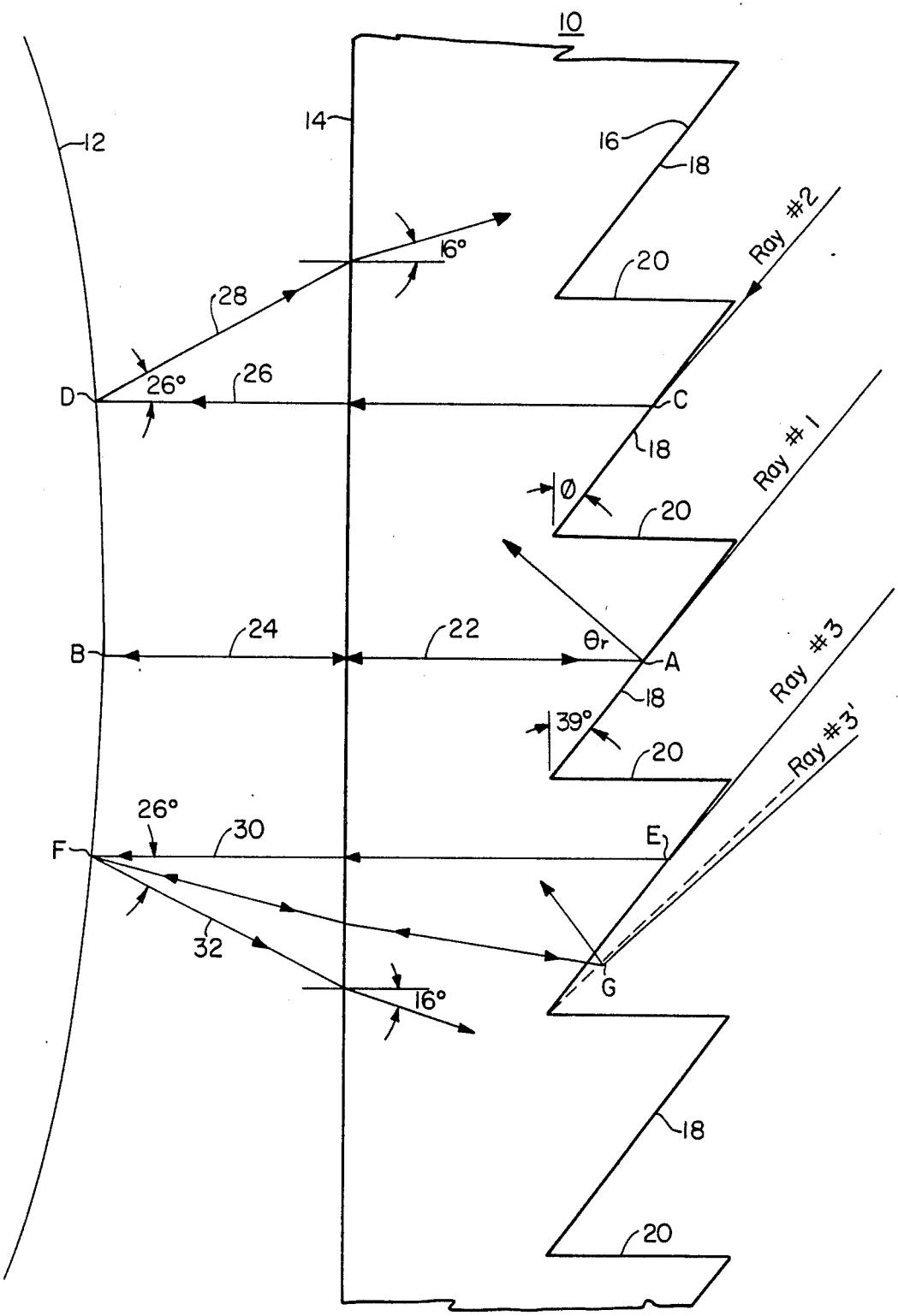
FIG. 1 is a side view of a portion of an anti-glare filter constructed according to the teachings of the present invention and a portion of a transmission screen, together with illustrative light rays demonstrating the operation of the present invention.

The present invention is directed to an anti-glare filter 10, a portion of which is shown in profile in FIG. 1. When the anti-glare filter 10 is placed in front of a CRT or other back projection display or in front of a liquid crystal display (LCD), it interrupts ambient light rays and light rays which have reflected from the face of the CRT and blocks their exit from the front face of the filter such that they are not seen by the operator.

FIG. 1 illustrates the basic principle of the present invention. The anti-glare filter 10 is placed in front of the viewing screen of a CRT 12. The filter 10 is comprised of a sheet of material having a substantially planar first or back face 14 and a second or front face 16 having a plurality of V-shaped grooves. Each of the grooves is formed by two walls, a first wall 18 and a second wall 20. The first wall 18 is inclined at an angle $\phi$ of at least the critical angle for the material of the anti-glare filter 10 with respect to the first face 14. This inclination provides the anti-glare filter 10 with unique properties which are a result of the filter's geometry. The selection of the angle of inclination $\phi$ of the first wall 18 with respect to the first face 14 is an important feature of the present invention and is discussed more fully hereinbelow.

The second wall 20 is shown in FIG. 1 as being substantially perpendicular to the first face 14 although it has been found that the second wall 20 may be inclined at an angle of as much as between plus or minus ten degrees with respect to a plane perpendicular to the first face 14.

In FIG. 1, the anti-glare filter 10 is constructed such that the first wall 18 is inclined at an angle $\phi$ of thirty-nine degrees with respect to the first face 14. Light ray no. 1 is the most critical light ray which can enter the first wall 18. Light ray no. 1 is representative of ambient light coming from the ceiling area, where most of the distracting light originates, from the nearest overhead light source. Assuming the index of refraction of the material comprising the anti-glare filter 10 is 1.6, light ray no. 1 will, upon entering the second face 16, be refracted according to Snell's Law which provides:

$$n_1 \sin \theta_i = n_2 \sin \theta_r \qquad eq~(1)$$

Where
$n_1$ = the index of refraction of material no. 1,
$\theta_i$ = the angle of incidence,
$n_2$ = the index of refraction of material no. 2, and
$\theta_r$ = the angle of refraction.

For the above equation, $n_1$ equals 1 for a light ray travelling through air, $\theta_i$ equals ninety degrees, and $n_2$ equals 1.6. Solving equation (1) for the angle of refraction $\theta_r$ yields a value of thirty-nine degrees which is measured from a plane perpendicular to the first wall 18. Thus, light ray no. 1, upon entering the anti-glare filter 10, is refracted at an angle of thirty-nine degrees which results in ray no. 1 proceeding substantially horizontally along path 22 until striking the first face 14 substantially perpendicularly.

The light ray no. 1, upon striking the first face 14, is reflected back along the same path 22 previously traveled until it strikes the second face 16 at point A, where it originally entered the anti-glare filter 10. The angle at which the portion 22 of ray no. 1 strikes point A of first wall 18 is thirty-nine degrees Solving equation (1) where $n_1$ now equals 1.6, $\theta_i$ equals thirty-nine degrees, and $n_2$ equals the angle of refraction $\theta_r$ is calculated to be ninety degrees. This indicates that this portion 22 of ray no 1 is the most critical ray which can escape from the filter 10. Any portion 22 of ray no. 1 striking point A at an angle greater than thirty-nine degrees will be internally reflected as shown in FIG. 1.

It can be demonstrated that after ray no. 1 is internally reflected at point A, it repeatedly strikes the first face 14 and second wall 18 at angles greater than thirty-nine degrees. Therefore, there will never be a refracted ray no. 1 from these surfaces. Ray no. 1 is thus said to be totally internally reflected such that no glare is caused by this light ray.

By solving equation (1) for various other angles of inclination $\phi$ of the first wall 18, it can be demonstrated that the critical angle for a given material must satisfy the following equation:

$$\sin~(\text{critical angle}) = 1/\text{index of refraction of material} \qquad eq~(2)$$

If the angle of inclination $\phi$ of the first wall 18 is less than the critical angle, light ray no. 1 will not strike the first face 14 perpendicularly. Thereafter, reflected ray no. 1 will not strike the first wall 18 at an angle greater than or equal to the critical angle such that total internal reflection will not be achieved. Conversely, if the angle of inclination $\phi$ of the first wall 18 is greater than the critical angle, ray no. 1 will be reflected off the first face 14 and will strike the first wall 18 at an angle greater than the critical angle such that the reflected ray no. 1 will be totally internally reflected. Thus, it is necessary for proper operation of the present invention that the angle of inclination $\phi$ of the first wall 18 with respect to the first face 14 be at least substantially equal to the critical angle for the material of which the anti-glare filter 10 is constructed.

Listed below are the critical angles of various materials which may be used to construct the anti-glare filter 10 of the present invention.

| MATERIAL | CRITICAL ANGLE |
|---|---|
| polymethylacrylate | 42.53 |
| polyethylacrylate | 42.92 |
| polytutylacrylate | 43.01 |
| polyethoxyethylacrylate | 42.83 |
| poly (2 methoxyethyl) acrylate | 43.12 |
| poly (2 bromo sec. butyl) acrylate | 40.43 |
| poly (2 bromo phenyl) acrylate | 38.34 |
| poly (2 chloromethyl) acrylate | 41.23 |
| polyacrylonitrile | 41.47 |
| polymethylmethacrylate | 42.16 |
| polyethylmethacrylate | 42.33 |
| poly butyl methacrylate | 42.4 |
| poly (t-butyl) methacrylate | 43.09 |
| polycyclohexyl methacrylate | 41.59 |
| poly (2-hydroxyethyl) methacrylate | 41.41 |

| MATERIAL | CRITICAL ANGLE |
|---|---|
| poly (2-phenoxyethyl) methacrylate | 39.96 |
| poly phenylmethacrylate | 34.82 |
| poly (o-chloro) styrene | 38.4 |
| poly (2.6 dichloro) styrene | 37.99 |
| poly (O—methoxy) styrene | 38.87 |
| polyacetal | 41.47 |
| poly (n-benzyl) methacrylamide | 38.78 |
| poly (N—butyl) methacrylamide | 41.36 |
| polyvinyl chloride | 40.53 |
| polyvinyl fluoride | 38.68 |
| polyvinylidene chloride | 38.68 |
| polyvinyl acetate | 42.97 |
| polyvinyl carbazole | 36.36 |
| polyvinyl isobutyl ether | 43.58 |
| polyvinyl alcohol | 41.81 |
| poly (n-vinyl) phthalimide | 38.13 |
| polyallyl phthalate | 41.21 |
| polyester-Styrene | 40.5 |
| poly (o-tolyl) methacrylate | 39.54 |
| poly carbonates (bisphenol) | 39.12 |
| poly (N—2, phenethy) methacrylamide | 39.01 |
| polystyrene | 38.93 |
| zinc crown glass | 41.24 |
| higher dispersion crown glass | 41.14 |
| light flint glass | 39.41 |
| heavy flint glass | 37.31 |
| heaviest flint glass | 31.94 |

Returning now to FIG. 1, light ray no. 1, upon striking the first face 14, is partially reflected back upon itself as discussed above while a portion 24 of the light ray no. 1 passes through the first face 14. The portion 24 of light ray no. 1 passing through the first face 14 impinges upon the face of the CRT 12 at point B. Because the portion 24 of ray no. 1 strikes the CRT 12 perpendicularly, it is reflected back upon itself, through first face 14, and back to point A where it strikes the first wall 18 at the critical angle of thirty-nine degrees. Thus, not only is the portion 22 of light ray no. 1 which is reflected from the first face 14 totally internally reflected, but the portion 24 of ray no. 1 is also totally internally reflected after it is reflected from the CRT 12.

In practice, however, most CRT's are somewhat curved about a horizontal axis as shown in FIG. 1. Thus, the further from point B light rays are when they impinge upon the CRT, the greater the reflected angle. Consider light ray no. 2 which enters the first face 16 at point C and is refracted at an angle of thirty-nine degrees such that it travels substantially parallel to the portion 22 of ray no. 1. When ray no. 2 strikes the first face 14, a portion (not shown) of the ray is reflected back upon itself and internally reflected just as in the case of ray no. 1. A portion 26 of ray no. 2 also passes through the first face 14 and strikes the CRT at point D. Because point D is displaced thirteen degrees from point B, a portion 28 of ray no. 2 is reflected at an angle of twenty-six degrees from the face of the CRT with respect to the portion 26 of ray no. 2. When the portion 28 of ray no. 2 strikes the first face 14, it is refracted according to Snell's Law at an angle of sixteen degrees. Proceeding at such an angle, ray no 2 will strike the first wall 18 at an angle greater than the critical angle such that ray no. 2 will be totally internally reflected.

Because the radius of curvature increases as you move further and further from point B, the angle of the light rays reflected off the surface of CRT above point B becomes greater and greater such that all such light rays will be totally internally reflected.

The situation is different with respect to the bottom half of the CRT 12. Light ray no. 3 enters the first face 16 at point E and travels substantially horizontally until the light ray no. 3 strikes the first face 14 of the anti-glare filter 10. A portion of the ray no. 3 will be reflected back upon itself (not shown) and a portion 30 of ray no. 3 will pass through the first face 14. The portion of the ray 30 passing through the first face 14 will be reflected off the CRT 12 at an angle of twenty-six degrees. This reflected portion 32 of the ray no. 3 will strike the first face 14 and be refracted at an angle of sixteen degrees. This refracted ray will strike the first wall 18 at an angle less than the critical angle and will therefore pass through the anti-glare filter and be visible by the user.

This situation can be cured by increasing the angle of inclination $\phi$ of the first wall 18 above the critical angle for the material or, alternatively, maintaining the angle while changing the material to a material having a higher index of refraction. If the difference between the angle of slope of the CRT 12 and the vertical at the point "F" is "a", then the increase ($\Delta$) in the angle of inclination $\phi$ of the first wall 18 above the critical angle of the material is provided by the following equation:

$$(\Delta) = (a/\text{index of refraction of the material}) \qquad \text{eq. (3)}$$

For the illustrated case, "a" equals thirteen degrees and the index of refraction of the material equals 1.6. Solving the equation yields a value for $\Delta$ of 8.08°. If the angle of inclination $\phi$ of the first wall 18 is increased by 8.08° as shown by the dotted line in FIG. 1, then ray no. 3' enters the second face 16 at point G. Ray no. 3' passes through the first face 14 and strikes the face of the CRT 12 perpendicularly such that ray no. 3' is reflected back upon itself. Upon passing back through the first face 14, ray no. 3' strikes the first wall 18 at an angle which is equal to the critical angle such that ray no. 3 is totally internally reflected.

Thus, another feature of the present invention is an anti-glare filter wherein the angle of inclination $\phi$ of the first wall 18 is chosen to be above the critical angle with respect to the first face 14 such that ambient light entering the second face 16, passing through the first face 14, reflecting off the CRT 12, and passing back through the first face 14, is totally internally reflected.

Figure 2:
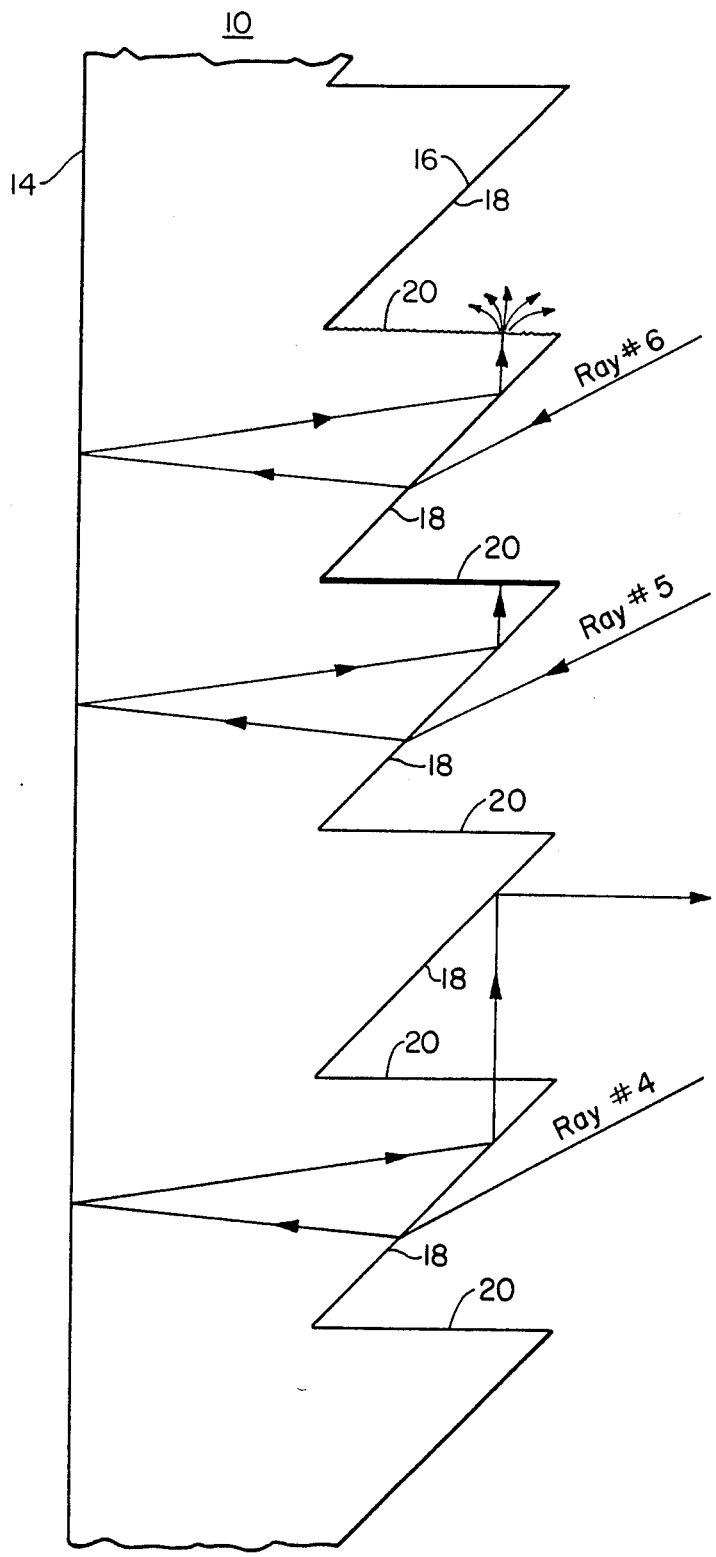
FIG. 2 is a side view of a portion of an anti-glare filter having roughened and blackened surfaces which improve the optical qualities of the filter.

As shown in FIG. 2, ambient light that has entered the anti-glare filter 10 and has been entrapped therein due to total internal reflection, can nonetheless still cause a distraction as illustrated by ray no. 4. Ray no. 4 enters the anti-glare filter 10 through first wall 18, is reflected off the first face 14, and is then reflected off the first wall 18 so as to strike second wall 20. Ray no. 4 strikes the second wall 20 perpendicularly such that the ray passes through the second wall 20 and out of the anti-glare filter 10. Ray no. 4 follows the path shown in FIG. 2 and is partially reflected back to the observer's eye causing the CRT 12 to have an over-all frosted appearance.

There are three ways to compensate for the light rays which escape from the anti-glare filter 10. First, the second wall 20 may be covered with an opaque material which will absorb light. This is illustrated in conjunction with ray no. 5 which follows a path similar to ray no. 4 but is absorbed by the second wall 20 such that no reflected light reaches the observer. A second approach is to provide the second wall 20 with a roughened surface. This is shown in conjunction with ray no. 6. Ray no. 6 follows a path similar to ray no. 4 but, upon striking second wall 20, is refracted in numerous directions by the roughened surface such that a miniscule portion of the light ray may be reflected back to the observer. A third approach is to provide a slight tint in the anti-glare filter 10 which will cut down on the light rays reflected back to the observer as well as increasing the contrast of the intelligence displayed on the CRT.

Another factor which must be considered in designing an anti-glare filter is the fact that in the case of a CRT, where the face of the CRT is curved either spherically or cylindrically, the anti-glare filter must also be curved to be substantially parallel to the curvature of the CRT in the horizontal plane. That is, the anti-glare filter 10 must be curved or bent around its vertical axis. Unless this is done, the rows or lines of the text appearing on the face of the CRT will appear to be arched. This phenomena is explained in conjunction with FIG. 3.

In FIG. 3, light source 34 is closer to the anti-glare filter 10 than light source 36. Light ray no. 7 follows the illustrated path and emerges from the second face 16 of the anti-glare filter 10 at point A. Light ray no. 7 then travels from point A to an observer's eye 38. If light ray no. 8 from the second light source 36 were to appear at the same vertical height as that of light ray no. 7 from the first light source 34, it too would have to emerge at point A. However, as shown in FIG. 3, ray no. 8 follows a path which passes the eye 38 of the observer well above eye-level and is not seen. The ray which the eye 38 of the observer does see is illustrated by ray no. 9 which emerges at point B, well below point A.

Thus, it is apparent that the further a point is from the anti-glare filter 10, the lower it appears to be to an observer. In the case of a CRT, along any horizontal line, a point at the extreme right or left of the CRT is further from a flat anti-glare filter 10 than a point at the center and appears to come from a point lower than does a point at the center. This causes a straight line on the CRT to be arched when viewed through a flat filter. Thus, bending the filter such that it is substantially parallel to the face of the CRT is necessary to overcome this phenomena.

A typical anti-glare filter 10 constructed according to the teachings of the present invention is, for example, constructed of a modified acrylic known in the trade as DR having a thickness of forty mils and an index of refraction of 1.49. The filter is approximately ten inches by ten inches with eighty horizontal V-shaped grooves per inch. Each groove is comprised of a horizontal wall 20 extending approximately twelve and one-half mils into the material and an inclined wall 18 having a slope of forty-five degrees with respect to the first face 14. The filter 10 is then placed an arbitrary distance from the viewing screen, with the distance being chosen to achieve the best overall viewing results.

The anti-glare filter 10 disclosed herein is particularly advantageous when used in conjunction with a liquid crystal display (LCD). Because LCD's depend on reflected ambient light for visibility and the liquid crystal is enclosed between two layers of glass, the surfaces of which are notorius glare producers, the anti-glare filter 10 of the present invention is extremely well-suited for LCD's. If a filter, such as a circularly polarized medium, is placed in front of a LCD to cut out surface glare, it also cuts out much of the ambient light on which the LCD depends for visibility and the display becomes unreadable. However, some filtering is needed since in many situations there is so much ambient light coming from so many different directions that the display is all but useless. The anti-glare filter 10 of the present invention does not depend on tint or polarization and therefore allows all the ambient light to enter.

At the same time, however, the anti-glare filter 10 does completely cancel all specular glare from the glass surfaces. Also, since most LCD's are flat, there is no curvature complication to contend with as in the case of CRT's. Therefore, it is very advantageous to use the present invention in conjunction with LCD's.

It will be understood that the embodiment described herein is merely exemplary and that a person of ordinary skill in the art may make many variations and modifications without departing from the spirit and scope of the invention. All such modifications and variations are intended to be included within the scope of the invention as defined in the appended claims.

What is claimed is:

1. A filter for reducing the glare of a viewing screen caused by ambient light, comprising: a substantially transparent sheet of material having first and second faces, said first face being substantially planar and said second face having a plurality of V-shaped grooves, each groove being formed by two walls, one of said walls being inclined at an angle of or above the critical angle of said material with respect to said first face, so that ambient light entering said second face, passing through said first face, reflecting off said viewing screen, and passing back through said first face is internally reflected.

2. The filter of claim 1 wherein the viewing screen includes a transmission screen.

3. The filter of claim 2 wherein said first and second faces are curved to follow the contours of said transmission screen.

4. The filter of claim 3 wherein said first and second faces are curved about a vertical axis.

5. The filter of claim 3 wherein said first and second faces are curved about a horizontal axis.

6. The filter of claim 2 wherein said other of said walls is coated with an opaque material.

7. The filter of claim 2 wherein said other of said walls has a rough surface.

8. The filter of claim 2 in said other of said walls is inclined at an angle of between plus ten degrees and minus ten degrees with respect to a line perpendicular to said first face.

9. The filter of claim 2 wherein said sheet of material is tinted.

10. The filter of claim 1 wherein the viewing screen includes a liquid crystal display.

11. The filter of claim 10 wherein a portion of said one of said walls is covered with an opaque material.

12. The filter of claim 11 wherein said portion of said one of said walls covered with said opaque material includes that portion of said one of said walls furthest from said first face.

13. The filter of claim 1 wherein said material has an index of refraction of 1.6.

14. The filter of claim 1 wherein said angle of inclination of said one of said walls includes an angle of 45°.

15. A method for reducing the glare of a viewing screen caused by ambient light comprising the steps of providing a filter comprised of a substantially transparent sheet of material having first and second faces, said first face being substantially planar and said second face having a plurality of V-shaped grooves, each groove being formed by two walls, one of said walls being inclined at an angle of at least the critical angle of said material with respect to said first face, so that ambient light entering said second face, passing through said first face, reflecting off said viewing screen, and passing back through said first face is internally reflected, and positioning said filter in front of said viewing screen.

* * * * *

UNITED STATES PATENT AND TRADEMARK OFFICE
CERTIFICATE OF CORRECTION

PATENT NO. : 4,697,881

DATED : Oct. 6, 1987

INVENTOR(S) : John Wilson Brown

It is certified that error appears in the above-identified patent and that said Letters Patent is hereby corrected as shown below:

Column 4, line 14, after the word "equals", insert --1,--.

Signed and Sealed this

Fifth Day of April, 1988

Attest:

DONALD J. QUIGG

*Attesting Officer*  *Commissioner of Patents and Trademarks*